(12) United States Patent
Lubin et al.

(10) Patent No.: US 12,240,221 B2
(45) Date of Patent: Mar. 4, 2025

(54) SYSTEM AND METHOD TO REDUCE THE VISIBILITY OF GLOSS DIFFERENTIALS ON PRINTED SHEETS

(71) Applicant: Xerox Corporation, Norwalk, CT (US)

(72) Inventors: Dara Nanette Lubin, Pittsford, NY (US); Matthew James Ochs, Webster, NY (US); Elizabeth Lee Barrese, Penfield, NY (US); Elizabeth Crossen, Churchville, NY (US); Ron Edward Dufort, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 112 days.

(21) Appl. No.: 18/045,013

(22) Filed: Oct. 7, 2022

(65) Prior Publication Data

US 2024/0116300 A1 Apr. 11, 2024

(51) Int. Cl.
| | |
|---|---|
| *B41J 11/00* | (2006.01) |
| *B41M 7/00* | (2006.01) |
| *G01N 21/55* | (2014.01) |
| *G01N 21/57* | (2006.01) |
| *G01N 21/89* | (2006.01) |

(52) U.S. Cl.
CPC ........ *B41J 11/0015* (2013.01); *B41J 11/0095* (2013.01); *B41M 7/00* (2013.01); *G01N 21/55* (2013.01); *G01N 21/57* (2013.01); *G01N 21/89* (2013.01); *G01N 2021/8917* (2013.01)

(58) Field of Classification Search
CPC .... B41J 11/0015; B41J 11/0095; B41M 7/00; G01N 21/55; G01N 21/89; G01N 2021/8917; G01N 21/57
See application file for complete search history.

(56) References Cited

U.S. PATENT DOCUMENTS

| | | | |
|---|---|---|---|
| 8,891,135 B2 | 11/2014 | Hoover et al. | |
| 2006/0067756 A1* | 3/2006 | Anderson | G03G 15/2014 399/341 |
| 2007/0071529 A1* | 3/2007 | Lee | G03G 15/6564 399/400 |
| 2010/0296848 A1* | 11/2010 | Yamamoto | G03G 9/08704 399/328 |
| 2013/0070277 A1* | 3/2013 | Hoover | H04N 1/6097 358/1.14 |

\* cited by examiner

*Primary Examiner* — Yaovi M Ameh
(74) *Attorney, Agent, or Firm* — Simpson & Simpson, PLLC (57) ABSTRACT

Printing system and method for reducing the visibility of gloss differentials having at least one computer-supported inline imaging unit assembly designed to measure specular light reflecting gloss differentials of printed ink. At least one smoothing roller assembly is operationally connected to at least one sheet transport assembly or a smoothing transport subassembly of the sheet transport assembly of the printing system. A smoothing roller assembly is designed to roll at least partly the length and width of at least one printed side of at least one printed sheet disposed along the transport subassembly, pressure generated by the smoothing roller assembly configured to reduce detected gloss differentials from printed ink. At least the outer surface of the at least one smoothing roller assembly is substantially at least one or more of metal and polyurethane.

17 Claims, 13 Drawing Sheets

SYSTEM AND METHOD TO REDUCE THE VISIBILITY OF GLOSS DIFFERENTIALS ON PRINTED SHEETS

FIELD OF THE INVENTION

The inventive concept relates generally to a system and method to reduce the visibility of gloss differentials on printed sheets.

BACKGROUND

When coated stocks are printed with high-speed inkjets, lines or bands of differential gloss may be visible and unacceptable for the associated work. The appearance of printed ink in inkjet systems depends at least partly on the surface of the coated stock. If the coated stock is marked, abraded, scuffed, rubbed, or changed in small areas on the page, a gloss differential mark may appear, often as thin bands along the printing process direction. A gloss differential, however, can be any visibly detectable anomaly in gloss on a printed sheet. The amount of gloss differential is also dependent on the amount of ink on the sheet with gloss bands more visible on large solid areas, especially where a substantial surface is intended to have a uniform color. Currently, the prevalent way to deal with gloss differentials is to replace printer heads, use a different paper, or move images so that large areas of solid colors are placed outside the band areas to reduce the band visibility or add a finishing operation such as varnishing or coating. However, even where such changes may succeed at preventing the creation of further gloss differentials, otherwise usable printed paper stock that has already been printed may have to be discarded. Therefore, there is a need in the market for an improved way to produce gloss printing without the completed printed sheet having differential marks.

SUMMARY OF THE INVENTION

Disclosed is a printing system and printing method for reducing the visibility of gloss differentials. The printing system has at least one inline imaging unit assembly designed to measure specular light reflected by an at least one printed sheet, incident light generated by at least one light assembly disposed at least one or more of crosswise and lengthwise to the inline imaging unit relative to the process direction of the at least one printed sheet, the at least one printed sheet disposed between the at least one inline imaging unit assembly and the at least one light assembly and substantially perpendicular to the normal at the incident and specular light vertex. At least one associated computer processor is designed to analyze the specular light measured by the inline imaging unit assembly, the analysis designed to detect gloss differentials of printed ink.

In some embodiments of the printing system for reducing the visibility of gloss differentials, at least one smoothing roller assembly is operationally connected to a smoothing transport subassembly of at least one sheet transport assembly of the printing system. The at least one smoothing roller assembly is designed to roll at least partly the length and width of at least one printed side of the at least one printed sheet disposed along the transport subassembly, pressure generated by the smoothing roller assembly configured to reduce detected gloss differentials.

In some embodiments of the printing system for reducing the visibility of gloss differentials, the at least one smoothing roller assembly is operationally connected to and a part of the at least one sheet transport assembly instead of the transport subassembly. In these embodiments, the pressure generated by the smoothing roller assembly is variable and engages in smoothing on demand.

In some embodiments of the printing system for reducing the visibility of gloss differentials, at least the outer surface of the at least one smoothing roller assembly is substantially at least one or more of metal and polyurethane. In some embodiments of the printing system for reducing the visibility of gloss differentials, the smoothing roller assembly includes at least one first roller and one second roller parallelly aligned along lengthwise axes, the first roller and the second roller designed to generate pressure on opposing surfaces and to axially rotate in opposite directions, the at least one printed sheet rolled therebetween.

In some embodiments of the printing system for reducing the visibility of gloss differentials, roller members of the at least one smoothing roller assembly are designed to have a full-length nip and are crowned. In some embodiments of the printing system for reducing the visibility of gloss differentials, angles of incident light and specular light are substantially equivalent opposite the normal and between 20 to 24 degrees respective to the at least one printed sheet. In some embodiments of the printing system for reducing the visibility of gloss differentials, at least one printed sheet is analytically divided cross-sectionally into two or more zones from which to compare gloss differentials. In some embodiments of the printing system for reducing the visibility of gloss differentials, the at least one smoothing roller assembly rotates faster than the pace of forward movement of the at least one printed sheet entering therethrough.

In any embodiments of the printing system for reducing the visibility of gloss differentials, the pressure generated by the smoothing roller assembly may be variable. In these embodiments, the pressure generated by the smoothing roller may be at least one or more of mechanically induced and magnetically induced.

The inventive concept, to include representative systems and a corresponding representative method, now will be described more fully hereinafter with reference to the accompanying drawings, which are intended to be read in conjunction with both this summary, the detailed description, and any preferred and/or particular embodiments specifically discussed or otherwise disclosed. Inventive concepts may, however, be embodied in many different forms and should not be construed as limited to the embodiments set forth herein; rather, these embodiments are provided by way of illustration only and so that this disclosure will be thorough, complete, and will fully convey the full scope of the inventive concepts to those skilled in the art.

DETAILED DESCRIPTION OF THE INVENTION

Following are more detailed descriptions of various related concepts related to, and embodiments of, methods and apparatus according to the present disclosure and associated printer environment. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

For a general understanding of the environment for the printer and the printer operational method, elements of the printer and the printer operational method are disclosed herein as well as the details for the disclosed system and method to reduce the visibility of gloss differentials on printed sheets. A gloss differential D can be any visibly detectable anomaly in gloss on a printed sheet. In the drawings, like reference numerals have been used throughout to designate like elements. As used herein, the word "printer" encompasses any apparatus that ejects ink drops onto different types of media substrates to form ink images.

Figure 10:
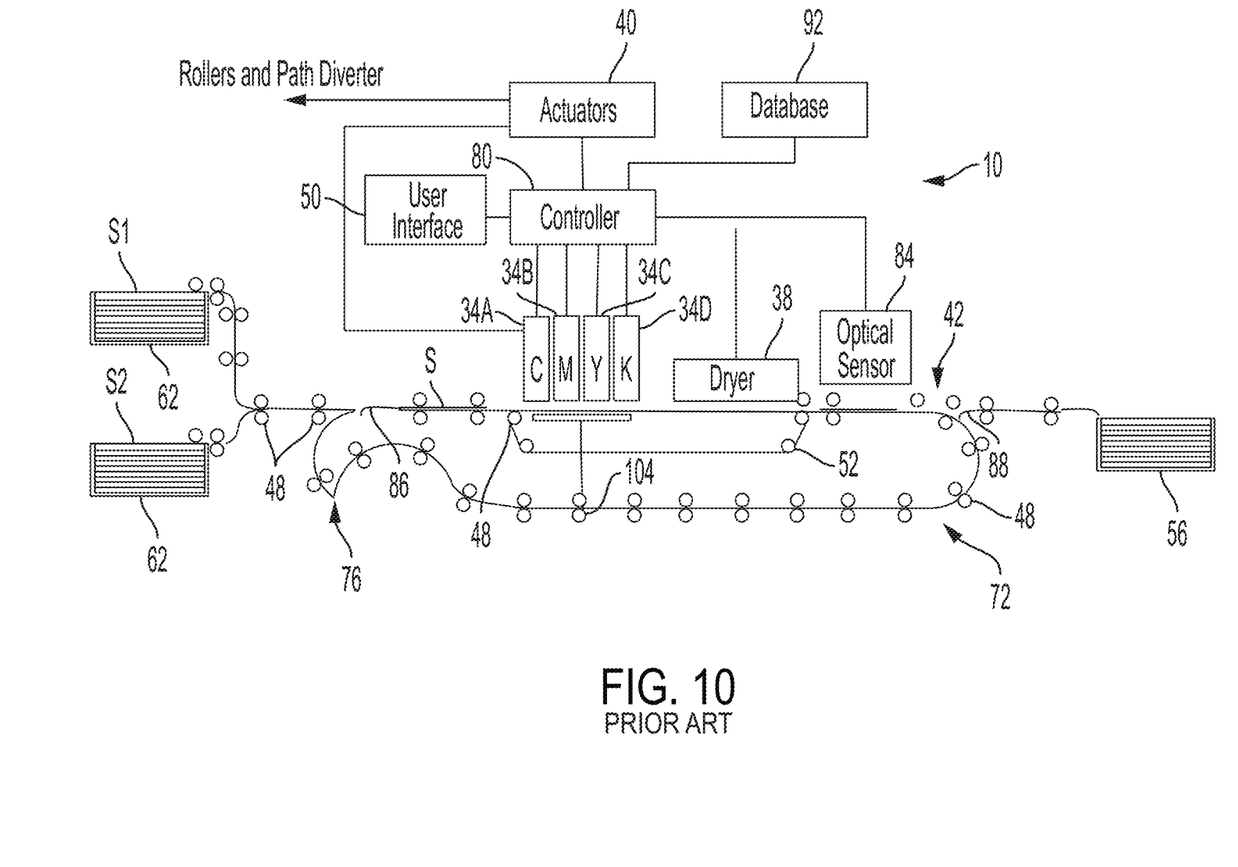
FIG. 10 is a block diagram of a prior art high-speed color inkjet printer that can produce color images on different types of media substrates.

FIG. 10 depicts a prior art high-speed color inkjet printer 10. As illustrated in this representative embodiment, the printer 10 is a printer that forms an ink image on a surface of a media sheet stripped from one of the supplies of media sheets $S_1$ or $S_2$ and the sheets S are moved through the printer 10 by a controller 80 operating one or more of the actuators 40 that are operatively connected to rollers 48 or to at least one driving roller of conveyor 52 that comprise a media transport assembly 42 through which at least one sheet S travels at least one time through at least one printhead module 34A, 34B, 34C, and 34D. A platen of high dielectric constant material 104 embedded with electrodes is operationally arranged in an interdigitated manner beneath the media transport assembly 42 and printhead module 34A, 34B, 34C, and 34D.

Although printer 10 is depicted with two supplies 62 of media sheets, the representative printer can be configured with other numbers of supplies including one, three, and more sheet supplies, each of which may contain a different type or size of media.

As illustrated in FIG. 10, the printed image passes under an image dryer 38 after the ink image is printed on a sheet S. The image dryer 38 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet S from the transport system 42 after a substrate has been printed and move it by the rotation of rollers 48 in an opposite direction to the direction of movement past the printheads. At position 76 in the duplex path 72, the substrate can be turned over so it can merge into the job stream being carried by the media transport system 42. The controller 80 is configured to flip the sheet S selectively. That is, the controller 80 can operate actuators to turn the sheet over so the reverse side of the sheet can be printed, or it can operate actuators so the sheet is returned to the transport path without turning over the sheet so the printed side of the sheet can be printed again.

Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 10, a substrate from media transport 42 is diverted to the duplex path 72. Rotating the pivoting member 88 in the clockwise direction from the diverting position closes access to the duplex path 72 so substrates on the media transport continue moving to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 10, the printed media sheets S not diverted to the duplex path 72 are carried by the media transport to the sheet receptacle 56 in which they are to be collected. Before the printed sheets reach the receptacle 56, they pass by an optical sensor 84. The optical sensor 84 generates image data of the printed sheets and this image data is analyzed by the controller 80, which is configured to determine which inkjets, if any, that were operated to eject ink did in fact do so or if they did not eject an ink drop having an appropriate mass or that landed errantly on the sheet.

A user can operate a user interface 50 to obtain reports displayed on the interface that identify the number of inoperative inkjets and the printheads in which the inoperative inkjets are located. The optical sensor can be a digital camera, an array of LEDs and photodetectors, or other devices configured to generate digital image data of a passing surface.

Figure 1A:
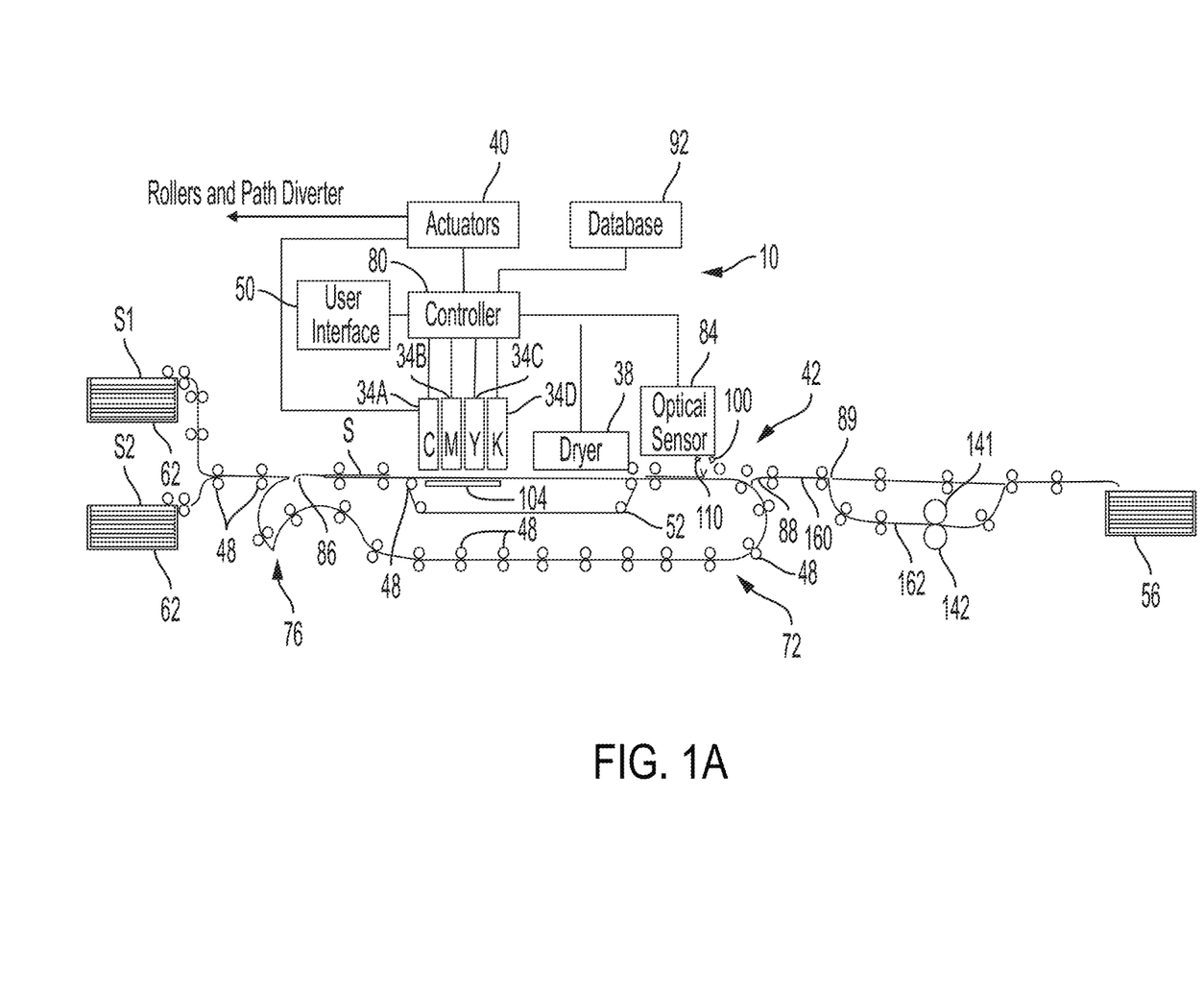
FIG. 1A illustrates a representative printing system for reducing the visibility of gloss differentials having smoothing rollers disposed on a smoothing transport subassembly of a transport assembly.
Figure 1B:
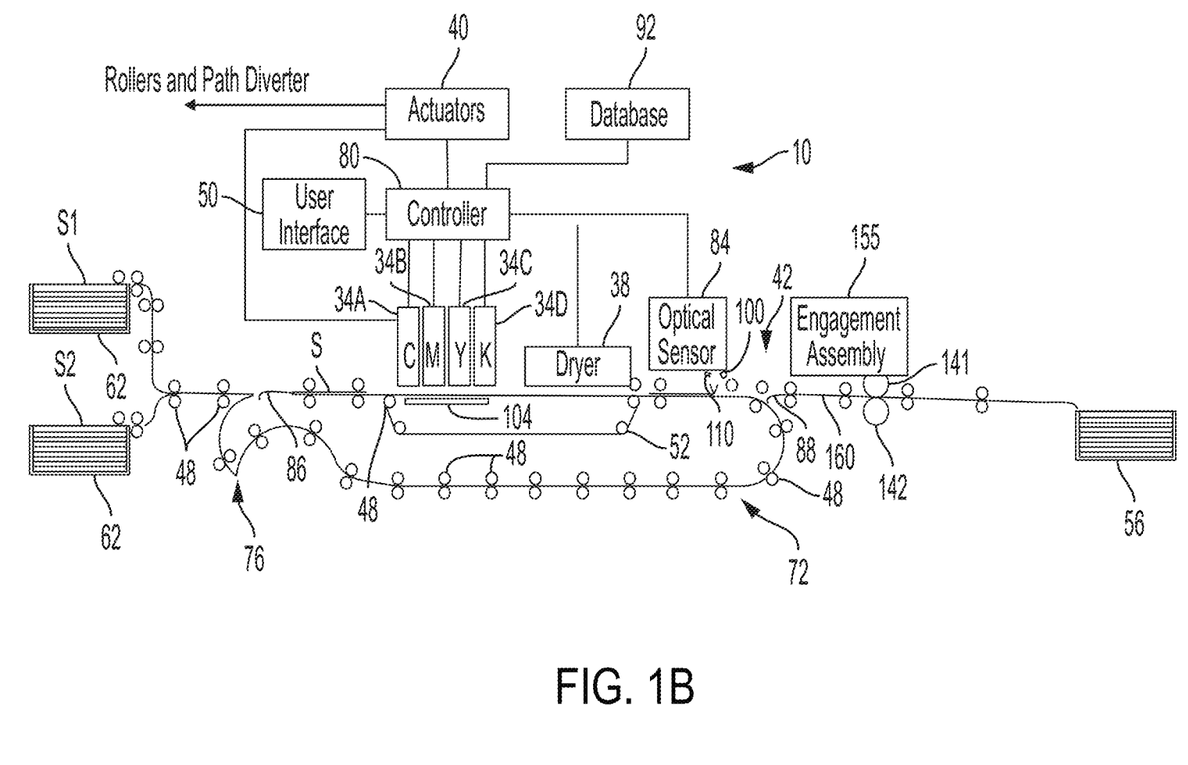
FIG. 1B illustrates a second representative printing system for reducing the visibility of gloss differentials having the smoothing rollers disposed on the transport assembly.
Figure 3:
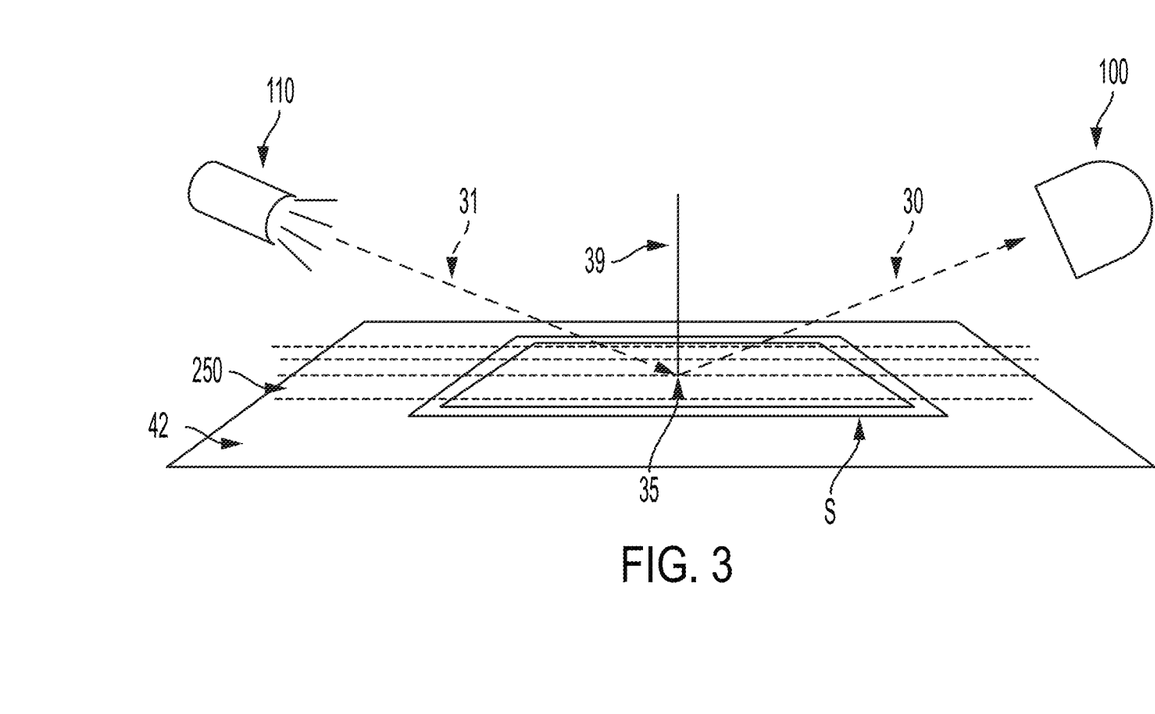
FIG. 3 illustrates a representative system for creating and analyzing specular light for detecting gloss differentials of printed ink.

Pertinent to the inventive concept, disposed generally in the area of the printer 10 in which the optical sensor 84 is disposed, and as illustrated in FIGS. 1A, 1B, and 3, at least one light assembly 110 is disposed crosswise to the inline imaging unit assembly 100 of which operation and configuration will be described. Image data may be stored and retrieved from a database 92 wherein data may be used to compare and refine image analysis.

As already noted, the media transport also includes a duplex path that can turn a sheet over and return it to the transport prior to the printhead modules so the opposite side of the sheet can be printed. While FIG. 10 illustrates the printed sheets as being collected in the sheet receptacle 56, sheets can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operably connected to the components of the printhead modules 34A-34D (and thus the printheads), the actuators 40, and the dryer 38. The ESS or controller 80, for example, is a self-contained, dedicated mini-computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a workstation connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet and may, in this disclosure, be used to determine the risk that a printed sheet S may have gloss differentials D.

Figure 2A:
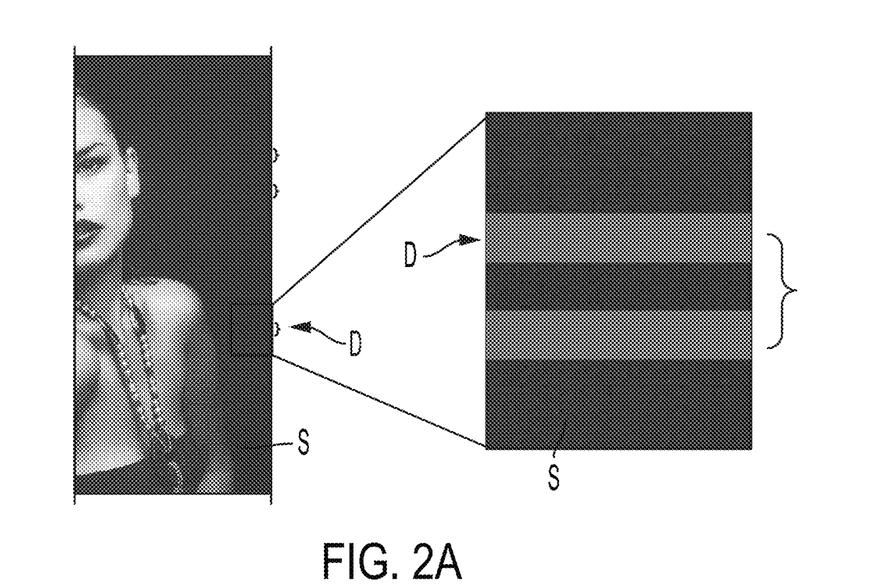
FIGS. 2A-2C illustrate representative gloss differentials and zones.
Figure 2B:
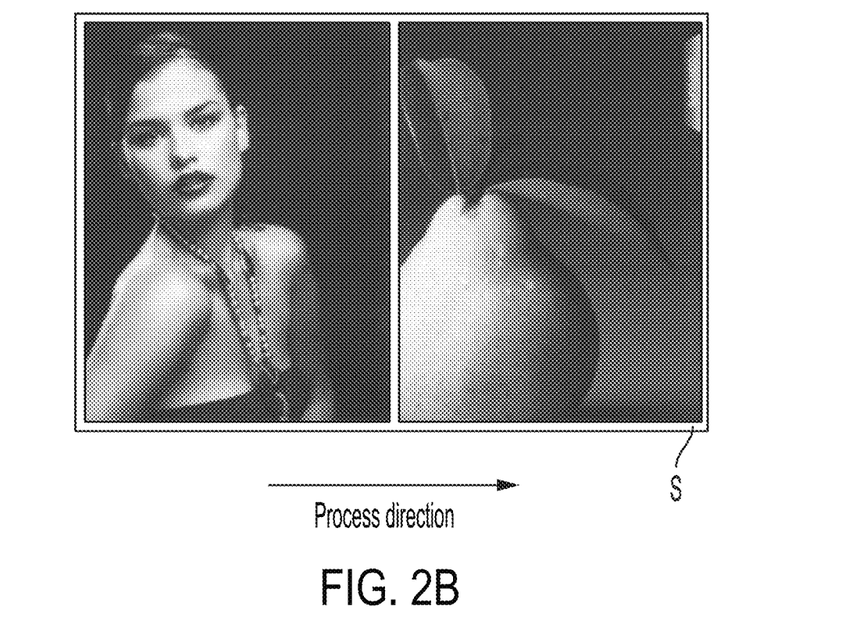
Figure 2C:
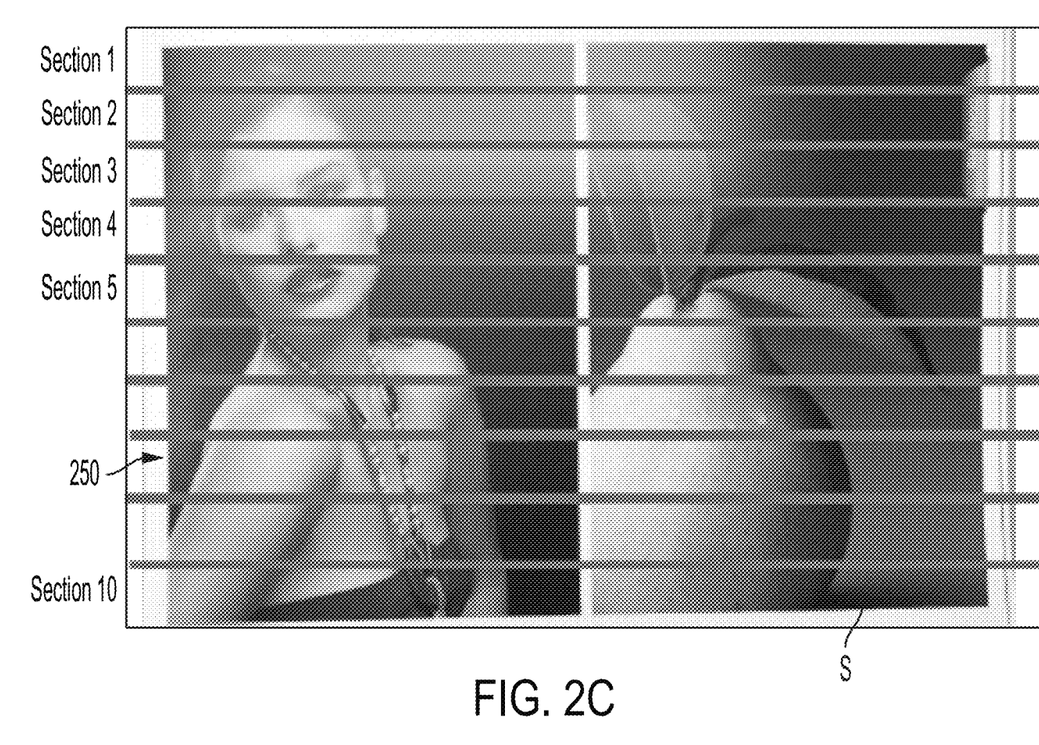

FIGS. 1A and 1B illustrate that disclosed are representative embodiments of printing systems 10 for reducing the visibility of, as illustrated in FIG. 2A-2C, gloss differentials D of printed ink. The printing system 10 has at least one inline imaging unit assembly 100, a machine-vision camera designed to measure, as illustrated in FIG. 3, specular light 30 reflected by an at least one printed sheet S, incident light 31 generated by at least one light assembly 110 disposed crosswise to the inline imaging unit assembly 100, the at least one printed sheet S disposed between the at least one inline imaging unit assembly 100 and the at least one light assembly 110 and substantially perpendicular to the normal 39 at the incident and specular light vertex 35. The at least one light assembly 110 may also be disposed lengthwise to the inline imaging unit assembly 100 in the process direction of the printed sheet S, and both orientations may be used in given printing systems 10. Reduced visibility of gloss differentials D need not be absolute but is designed to be within a range difficult to impossible for a human eye to detect, difficult meaning an ordinary person seeing the image would not notice differentials without scrutiny.

FIGS. 1A and 1B further illustrate that at least one associated computer processor 80 is designed to analyze the specular light 30 measured by the inline imaging unit assembly 100, the analysis designed to detect gloss differentials D. The at least one computer processor 80 may be a separate processor and it may also be an at least one computer processor 80 already a part of the printer system. The computer processor 80 may further determine whether a given printed sheet S is at risk of having gloss differentials D based on, but not limited to, such information as whether an image is printed, the type of image being printed, the size of the image, the color of the image, the type of ink, the type of paper stock, and the condition of the print heads 34A-34D.

FIG. 3 further illustrates that in some embodiments of the printing system 10 for reducing the visibility of gloss differentials D, angles of incident light 31 and specular light 30 are substantially equivalent opposite the normal and between 20 to 24 degrees respective to the at least one printed sheet S. Other angles may be used and may involve tradeoffs between the best-fit angle that could be used and the angles available within given printing systems 10. Compensation for different angles may be made within the at least one computer processor 80. In the preferred embodiment, the angle is about 22 degrees, but other angles may be used. In some embodiments, at least one or more of the inline imaging unit 100 and the light assembly 110 may be variable to facilitate scanning gloss differentials D.

As further illustrated in FIGS. 2C and 3, in embodiments of the representative printing system 10 for reducing the visibility of gloss differentials D, at least one printed sheet S is analytically divided at least one or more of cross-sectionally or in a process direction into two or more zones 250 from which to compare gloss differentials. There is no upper limit to the number of zones 250, and the number of zones 250 may depend on the gloss differential smoothing deemed acceptable for the given printing system 10. The resulting measurements of gloss differentials are assigned to the zones 250 across the at least one paper sheet S.

Representative zones 250 illustrate gloss differentials as a band and could be termed gloss band differentials as a subset of gloss differentials where, in the representative embodiment, the band is an area of the print sheet extending along the process direction. Other band orientations may be used. The measurements are compared to one another to see if any zone 250, in one representative embodiment, is more than 20 percent greater than the others. Other percentage thresholds may be used, and percentages may further vary based on at least one or more of color, contrast, texture, and shade even on the same at least one printed sheet S. If a given percentage threshold is at least one or more of crossed and predicted to be crossed, the at least one paper sheet S may be diverted to, as illustrated in FIG. 1A, a smoothing transport subassembly 162 from an at least one sheet transport assembly 72 via a pivoting member 89.

Figure 6A:
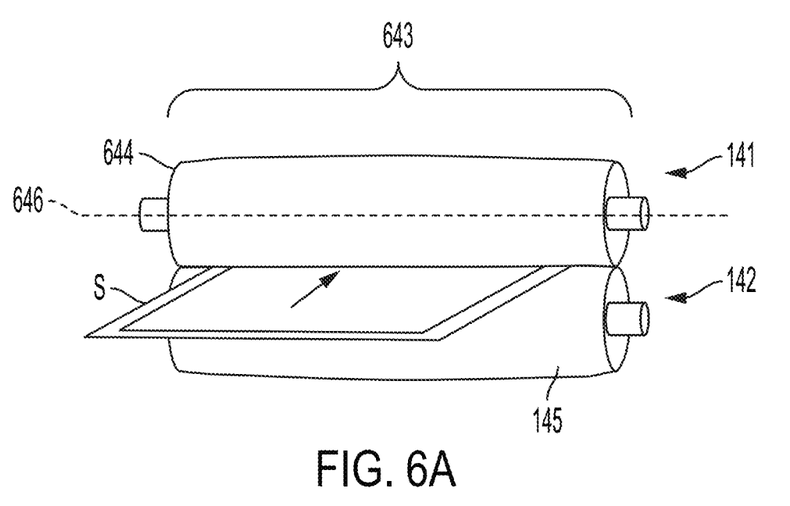
FIGS. 6A-6B illustrate crowned and uncrowned roller members.
Figure 6B:
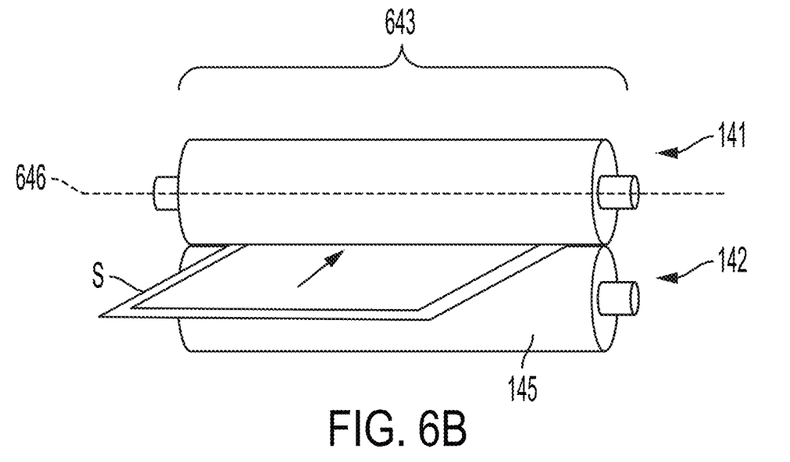
Figure 7A:
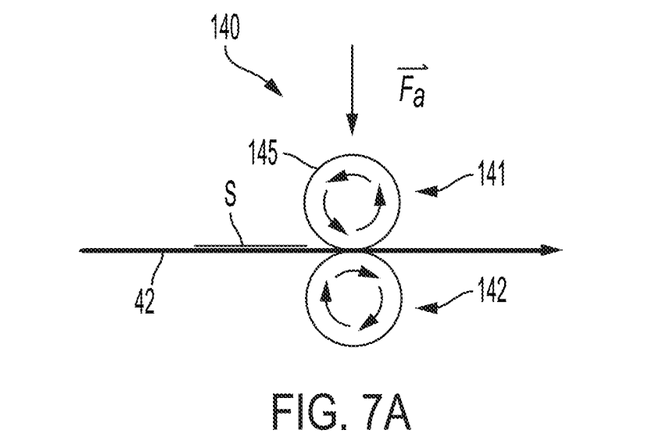
FIGS. 7A-7B illustrate a representative smoothing roller assembly along the transport assembly.
Figure 7B:
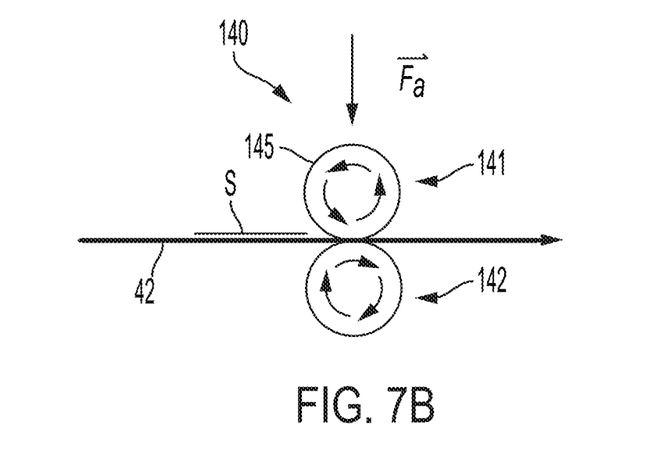

FIG. 1A illustrates that at least one smoothing roller assembly 140 is operationally connected to the smoothing transport subassembly 162 of the at least one sheet transport assembly 42 of the printing system 10. The at least one smoothing roller assembly 140 is designed to roll at least partly the length and width of at least one printed side of the at least one printed sheet S disposed along the transport subassembly 162. Pressure generated by the smoothing roller assembly 140 is configured to reduce detected gloss differentials D. In the disclosed embodiments, and as illustrated in FIG. 6A-6B, the smoothing rollers can smooth the entire horizontal span of the at least one printed sheet S. In some embodiments of the representative printing system 10 for reducing the visibility of gloss differentials D, the at least one smoothing roller assembly 140 rotates faster than the pace of forward movement of the at least one printed sheet S entering therethrough.

As illustrated in FIGS. 4A-4B and 7A-7B, in some embodiments of the printing system 10 for reducing the visibility of gloss differentials D, the smoothing roller assembly 140 includes at least one first roller 141 and one second roller 142 parallelly aligned along lengthwise axes 646, the first roller 141 and the second roller 142 designed to generate pressure on opposing surfaces 145 and to axially rotate in opposite directions, the at least one printed sheet S rolled therebetween.

Figure 4A:
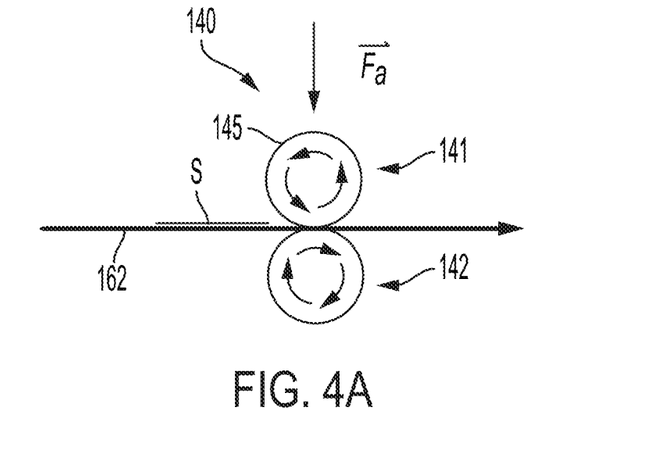
FIGS. 4A-4B illustrate a representative smoothing roller assembly having a smoothing transport subassembly.
Figure 4B:
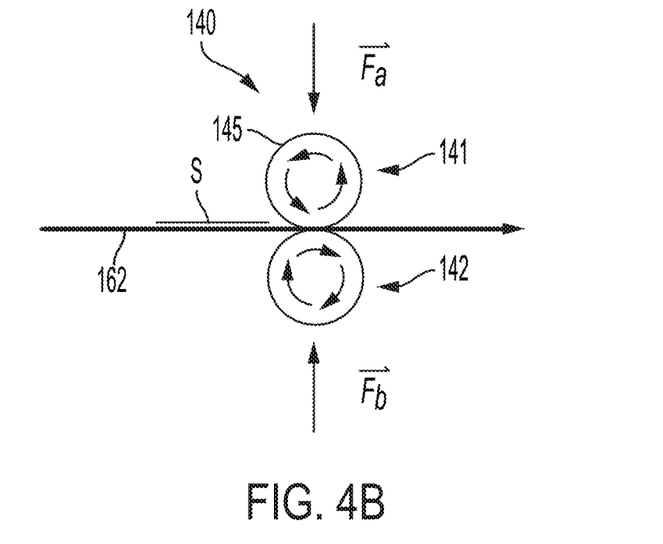

As further illustrated in FIGS. 4A-4B, in some embodiments of the printing system 10 for reducing the visibility of gloss differentials D, the pressure generated by the smoothing roller assembly 140 may be variable. In these embodiments, the pressure generated by the smoothing rollers 141, 142 may be at least one or more of mechanically induced and magnetically induced. Such embodiments may gather force from such elements known in the art as springs, rotating and helically threaded members, hydraulic members, electro-magnets as might draw roller supports toward each other, and though not the variable component, pressure that may be retained based on how roller members 141, 142 may press against each other when in a resting state. Other ways to generate mechanical pressure may be used. In these embodiments, mechanical force may be applied to one or both smoothing rollers 141, 142 of the smoothing roller assembly 140 ranging from substantially no pressure to an upper limit set relative to the force the given system can generate and the pressure that would create the desired result on the at least one printed sheet S. Some embodiments may rely in whole or in part on gravitational force to generate pressure from the upper roller 141. In some embodiments, the smoothing roller assembly 140 may be designed for deliberate heat transfer to change the temperature of the roller members 141, 142. Heat transfer may be used to raise or lower the temperature of the roller members 141, 142.

Figure 5:
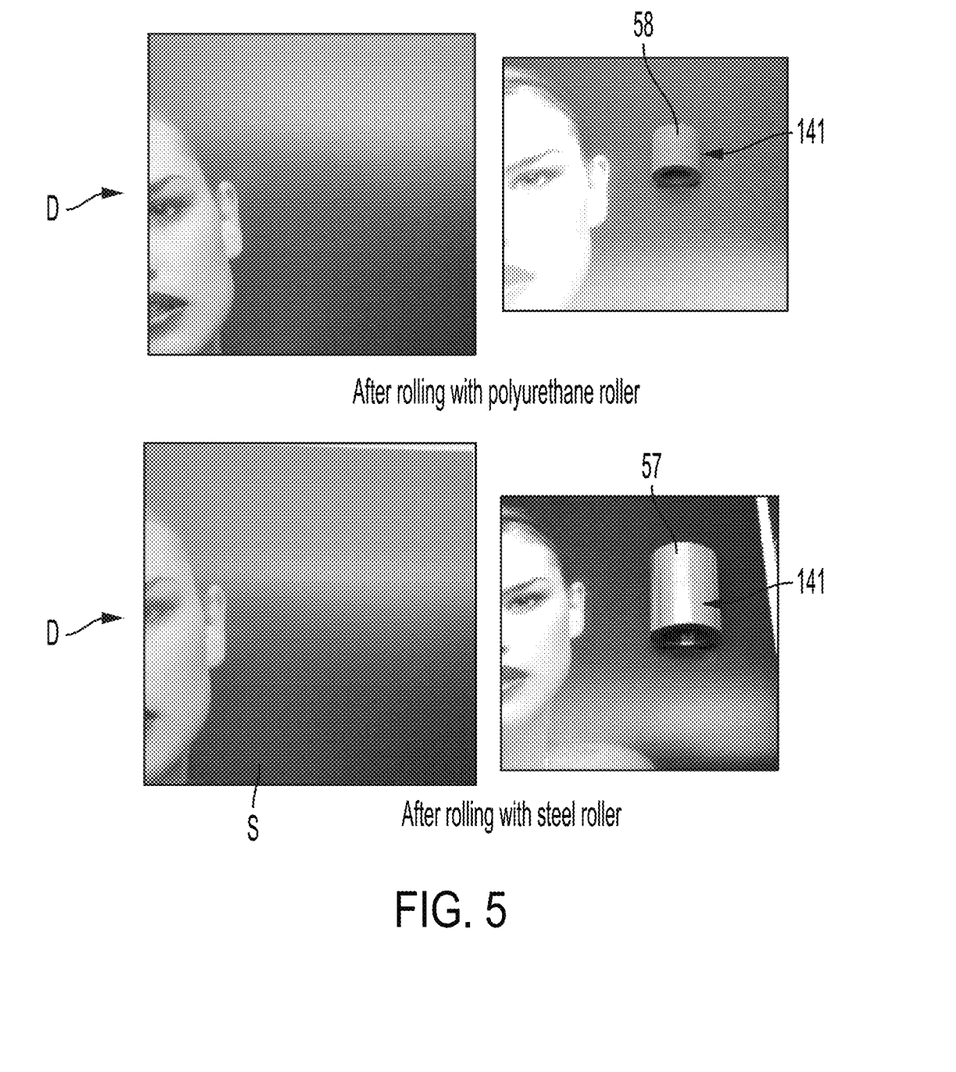
FIG. 5 illustrates representative smoothing results with singular and dual force vectors.

As illustrated in FIG. 5, in some embodiments of the printing system 10 for reducing the visibility of gloss differentials D, at least the outer surface 145 of the at least one smoothing roller assembly 140 is substantially at least one or more of metal 57 and polyurethane 58. Metal embodiments 57 may be designed to impart higher pressure on the at least one printed sheet S than may be expedient with comparable polyurethane embodiments 58.

FIG. 6A-6B illustrate that in some embodiments of the printing system 10 for reducing the visibility of gloss differentials D, roller members of the at least one smoothing roller assembly 140 are designed to have a full-length nip 643 and are crowned 644. The degree of crowning 644 may depend at least partly on whether a metal or polyurethane surface 145 is used and the range of pressure to be applied to the at least one printed sheet S where, considering expected operations, the system can apply substantially uniform pressure across the entire targeted span of the at least one printed sheet S.

FIGS. 6A-6B further illustrate that in some embodiments of the printing system 10 for reducing the visibility of gloss differentials D, the smoothing roller assembly 140 may only roll across part of the at least one printed sheet S, and in such embodiments, associated smoothing roller members 141, 142 may, as illustrated in FIG. 5, be narrower than the width of the printed sheet S and may also be mobile across the horizontal span of the at least one printed sheet S. In any embodiment, more than one pair of roller members 141, 142 may be used.

FIG. 1B illustrates that in some alternative embodiments of the printing system 10 for reducing the visibility of gloss differentials D, the at least one smoothing roller assembly 140 is operationally connected to the at least one sheet transport assembly 42. In these embodiments, the pressure generated by the smoothing roller assembly 140 is designed to be variable as the at least one printed sheet S passes through on its standard course along the sheet transport assembly 42. The pressure generated by the smoothing roller assembly 140 may at least one or more of be mechanically induced and magnetically induced on demand via an engagement assembly 155 that would include requisite motors, cams, supports, and other elements needed to adjust the pressure generated by roller members 141, 142. In these embodiments, at least one roller member 141, 142 may be retractable to deliver no pressure when unneeded. Whereas in some embodiments, as illustrated in FIG. 1A, the at least one printed sheet S may be diverted to the smoothing roller assembly 140 along the sheet transport subassembly 162, in these alternative embodiments, as illustrated in FIG. 1B, the at least one printed sheet S would stay on the at least one sheet transport assembly 42 without needing to be diverted. Some variances, however, in flow speed in any embodiment may occur to reflect using the smoothing roller assembly 140 on the at least one printed sheet S.

In embodiments of the disclosed printing system 10 apply to the at least one printed sheet S, applied ink is dry or substantially dry wherein the ink would stay affixed to the at least one printed sheet S. Some variances in flow speed in any embodiment may occur to reflect the type of ink and paper sheets S used.

Printing systems 10 may be inkjet, piezo electric, or other printers as might apply an ink or ink-like substance that could create gloss differentials D and that would respond to pressure for reducing gloss differentials D.

Figure 8A:
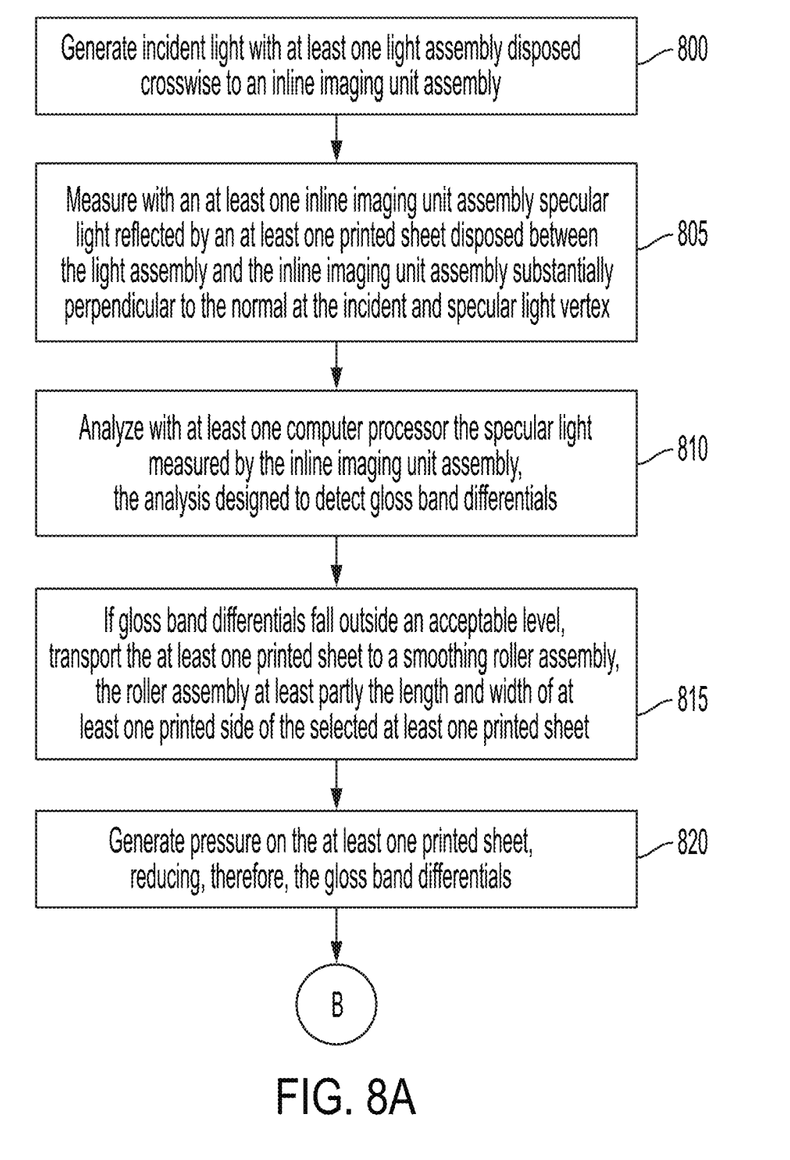
FIGS. 8A-8B illustrate a representative method for reducing the visibility of gloss differentials.
Figure 8B:
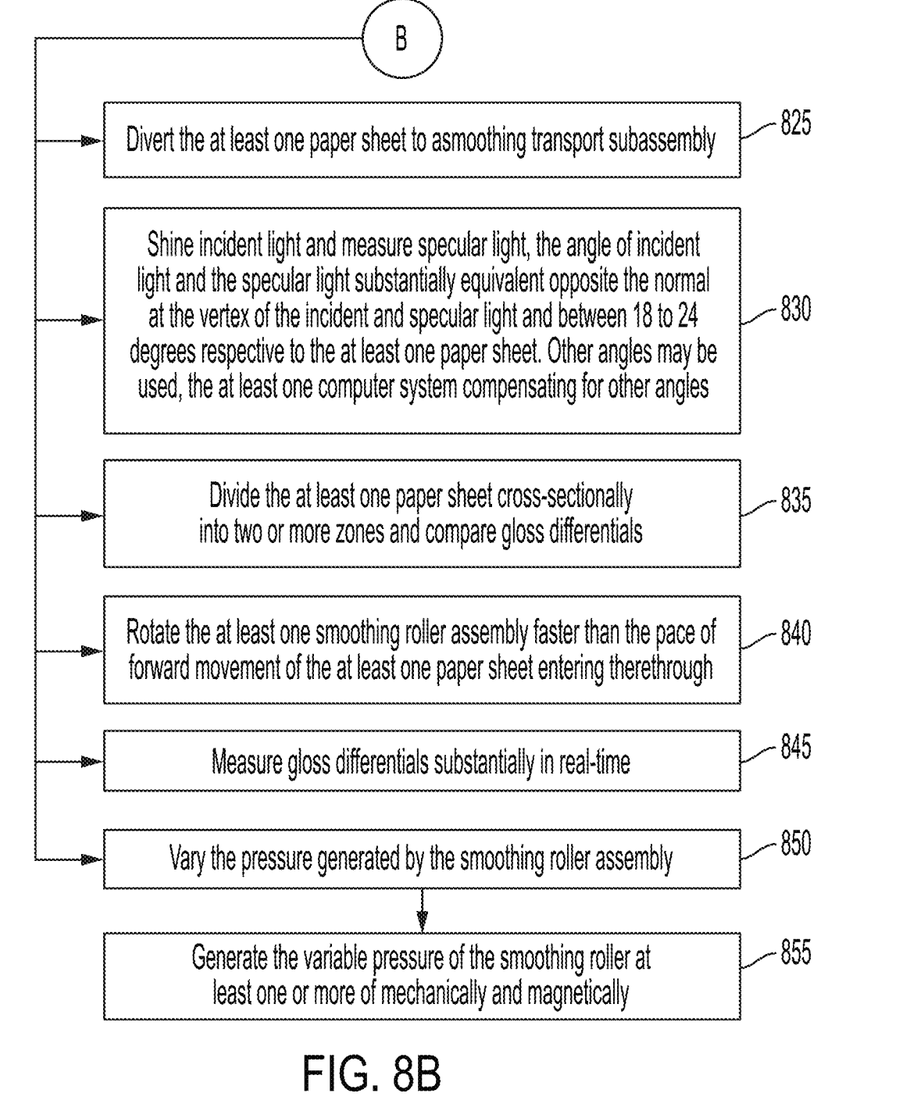
Figure 9:
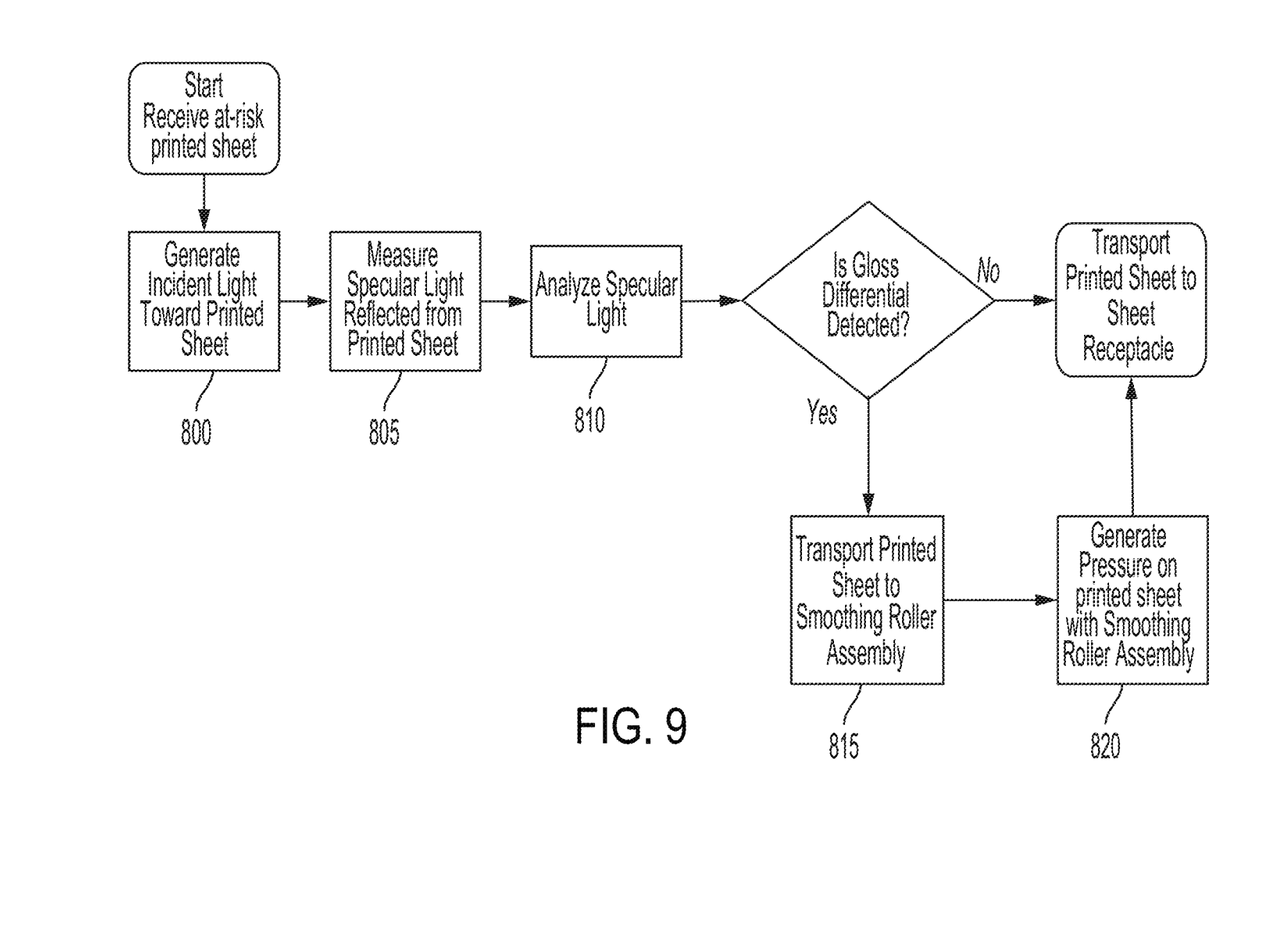
FIG. 9 is a second illustration of the representative method for reducing the visibility of gloss differentials.

FIG. 8A-8B illustrate a printing method for reducing the visibility of gloss differentials D including the step of 800, generating incident light 31 with at least one light assembly 110 disposed crosswise to the inline imaging unit assembly 100. The method further includes the step of 805, measuring with the at least one inline imaging unit assembly 100 specular light 30 reflected by the at least one printed sheet S disposed between the light assembly 110 and the inline imaging unit assembly 100 substantially perpendicular to the normal at the incident and specular light vertex 35. The method further includes the step of 810, analyzing with at least one computer processor 80 the specular light 30 measured by the inline imaging unit assembly 100, the analysis designed to detect gloss differentials D.

FIG. 8A-8B illustrate that the method further includes the step of 815, if gloss differentials fall outside an acceptable level, transporting the at least one printed sheet S to a smoothing roller assembly 140 at least partly the length and width of at least one printed side of the selected at least one printed sheet S and the step of 820, generating pressure on the at least one printed sheet, reducing, therefore, the gloss differentials D. The method may further include the step of 825, diverting the at least one printed sheet S to the smoothing transport subassembly 162 illustrated in FIG. 1A FIG. 8A-8B further illustrate that the printing method for reducing the visibility of gloss differentials D may further include the step of 830, shining incident light 31 and measuring specular light 30, the angle of incident light 31 and the specular light 30 substantially equivalent opposite the normal at the vertex of the incident and specular light 35 and between 20 to 24 degrees respective to the at least one printed sheet S. Other angles may be used, the at least one computer processor 80 compensating for other angles. The printing method for reducing the visibility of gloss differentials D may further include the step of 835, dividing the at least one printed sheet S cross-sectionally into two or more zones 250 and comparing gloss differentials D.

FIG. 8A-8B further illustrate that the printing method for reducing the visibility of gloss differentials D may further include the step of 840, rotating the at least one smoothing roller assembly 140 faster than the pace of forward movement of the at least one printed sheet S entering therethrough. The printing method for reducing the visibility of gloss differentials D may further include the step of 845, measuring gloss differentials D substantially in real-time.

FIG. 8A-8B further illustrate that the printing method for reducing the visibility of gloss differentials D may further include the step of 850, varying the pressure generated by the smoothing roller assembly 140. The printing method for reducing the visibility of gloss differentials D may further include the step of 855, generating the variable pressure of the smoothing rollers 141, 142 at least one or more of mechanically and magnetically.

The following patent is incorporated by reference in its entirety: U.S. Pat. No. 8,891,135B2.

While inventive concepts have been described above in terms of specific embodiments, it is to be understood that the inventive concepts are not limited to these disclosed embodiments. Upon reading the teachings of this disclosure, many modifications and other embodiments of the inventive concepts will come to mind of those skilled in the art to which these inventive concepts pertain, and which are intended to be and are covered by both this disclosure and the appended claims. It is indeed intended that the scope of the inventive concepts should be determined by proper interpretation and construction of the appended claims and their legal equivalents, as understood by those of skill in the art relying upon the disclosure in this specification and the attached drawings.

The invention claimed is:

1. A printing system for reducing the visibility of gloss differentials comprising:
at least one inline imaging unit assembly adapted to measure specular light reflected by an at least one printed sheet, incident light generated by at least one light assembly disposed at least one or more of crosswise and lengthwise to the inline imaging unit, the at least one printed sheet disposed between the at least one inline imaging unit assembly and the at least one light assembly and substantially perpendicular to the normal at the incident and specular light vertex;
at least one computer processor adapted to analyze the specular light measured by the inline imaging unit assembly, the analysis adapted to detect gloss differentials of printed ink;
at least one smoothing roller assembly, the smoothing roller assembly operationally connected to a smoothing transport subassembly of at least one sheet transport assembly; and
the at least one smoothing roller assembly adapted to selectively roll the whole length and width of at least one printed side of the at least one printed sheet or part of the length and width of the at least one printed side of the at least one printed sheet disposed along the transport subassembly, pressure generated by the smoothing roller assembly configured to reduce detected gloss differentials of the at least one printed sheet if gloss differentials fall outside an acceptable level.

2. The printing system for reducing the visibility of gloss differentials of claim 1 wherein at least the outer surface of the at least one smoothing roller assembly is substantially at least one or more of metal and polyurethane.

3. The printing system for reducing the visibility of gloss differentials of claim 1 wherein the smoothing roller assembly includes at least one first roller and one second roller parallelly aligned along lengthwise axes, the first roller and the second roller adapted to generate pressure on opposing surfaces and to axially rotate in opposite directions, the at least one printed sheet rolled therebetween.

4. The printing system for reducing the visibility of gloss differentials of claim 1 wherein roller members of the at least one smoothing roller assembly are adapted to have a full-length nip and are crowned.

5. The printing system for reducing the visibility of gloss differentials of claim 1 wherein the angles of incident light and specular light are substantially equivalent opposite the normal of their vertex and between 20 to 24 degrees respective to the at least one printed sheet.

6. The printing system for reducing the visibility of gloss differentials of claim 1 wherein the at least one printed sheet is analytically divided cross-sectionally into two or more zones from which to compare gloss differentials.

7. The printing system for reducing the visibility of gloss differentials of claim 1 wherein the at least one smoothing roller assembly rotates faster than the pace of forward movement of the at least one printed sheet entering therethrough.

8. The printing system for reducing the visibility of gloss differentials of claim 1 wherein the pressure generated by the smoothing roller assembly is variable.

9. The printing system for reducing the visibility of gloss differentials of claim 8 wherein the pressure generated by the smoothing roller is at least one or more of mechanically induced and magnetically induced.

10. A printing method for reducing the visibility of gloss differentials comprising:
generating incident light with at least one light assembly disposed crosswise to an inline imaging unit assembly;
measuring with the at least one inline imaging unit assembly specular light reflected by an at least one printed sheet disposed between the light assembly and the inline imaging unit assembly substantially perpendicular to the normal at the incident and specular light vertex;
analyzing with at least one computer processor the specular light measured by the inline imaging unit assembly, the analysis adapted to detect gloss differentials of printed ink;
if gloss differentials fall outside an acceptable level, transporting the at least one printed sheet to a smoothing roller assembly, the smoothing roller assembly selectively rolling the whole length and width of at least one printed side of the at least one printed sheet or part of the length and width of the at least one printed side of the selected at least one printed sheet; and, generating pressure on the at least one printed sheet, reducing, therefore, the gloss differentials of the at least one printed sheet if gloss differentials fall outside an acceptable level.

11. The printing method for reducing the visibility of gloss differentials of claim 10, the method further including diverting the at least one printed sheet to a smoothing transport subassembly.

12. The printing method for reducing the visibility of gloss differentials of claim 10, the method further including shining incident light and measuring specular light, the angle of incident light and the specular light substantially equivalent opposite the normal at the vertex of the incident and specular light and between 20 to 24 degrees respective to the at least one printed sheet.

13. The printing method for reducing the visibility of gloss differentials of claim 10, the method further including dividing the at least one printed sheet cross-sectionally into two or more zones and comparing gloss differentials.

14. The printing method for reducing the visibility of gloss differentials of claim 10, the method further including rotating the at least one smoothing roller assembly faster than the pace of forward movement of the at least one printed sheet entering therethrough.

15. The printing method for reducing the visibility of gloss differentials of claim 10, the method further including measuring gloss differentials substantially in real-time.

16. The printing method for reducing the visibility of gloss differentials of claim 10, the method further including varying the pressure generated by the smoothing roller assembly.

17. The printing method for reducing the visibility of gloss differentials of claim 16, the method further including generating the variable pressure of the smoothing roller at least one or more of mechanically and magnetically.

* * * * *